(12) United States Patent
Sakamoto (10) Patent No.: US 8,699,575 B2
(45) Date of Patent: Apr. 15, 2014

(54) MOTION VECTOR GENERATION APPARATUS, MOTION VECTOR GENERATION METHOD, AND NON-TRANSITORY COMPUTER-READABLE STORAGE MEDIUM

(75) Inventor: Daisuke Sakamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 346 days.

(21) Appl. No.: 13/286,688

(22) Filed: Nov. 1, 2011

(65) Prior Publication Data

US 2012/0114041 A1    May 10, 2012

(30) Foreign Application Priority Data

Nov. 8, 2010    (JP) ................................ 2010-250258

(51) Int. Cl.
*H04N 7/12*    (2006.01)
(52) U.S. Cl.
USPC .................... 375/240.16; 382/236; 348/416.1
(58) Field of Classification Search
USPC .................................................. 375/240.16
See application file for complete search history.

(56) References Cited

U.S. PATENT DOCUMENTS

| | | | | |
|---|---|---|---|---|
| 6,266,371 | B1* | 7/2001 | Kondo | 375/240.16 |
| 6,778,605 | B1* | 8/2004 | Hamanaka | 375/240.16 |
| 2006/0285596 | A1* | 12/2006 | Kondo et al. | 375/240.16 |
| 2009/0257493 | A1* | 10/2009 | Ye et al. | 375/240.12 |

FOREIGN PATENT DOCUMENTS

| | | |
|---|---|---|
| JP | 06-296276 | 10/1994 |
| JP | 2008-154072 | 7/2008 |

* cited by examiner

*Primary Examiner* — David Czekaj
*Assistant Examiner* — Janese Duley
(74) *Attorney, Agent, or Firm* — Cowan, Liebowitz & Latman, P.C.

(57) ABSTRACT

A motion vector generation apparatus which generates a motion vector utilized to execute motion-compensated encoding based on comparison between a block to be encoded in an image to be encoded and a reference block in a reference image. The apparatus sequentially selects a candidate from a plurality of motion vector candidates, sequentially calculates differences between pixel values of the block to be encoded and pixel values of the reference block corresponding to respective motion vector candidates, calculates, as an average difference, differences between an average pixel value obtained by averaging the pixel values of the block to be encoded and respective pixel values of the block to be encoded, decides a weighting coefficient based on a ratio between a minimum difference and the average difference, and calculates, for each selected motion vector candidate, an evaluation value for deciding a motion vector candidate having a minimum evaluation value.

9 Claims, 6 Drawing Sheets

MOTION VECTOR GENERATION APPARATUS, MOTION VECTOR GENERATION METHOD, AND NON-TRANSITORY COMPUTER-READABLE STORAGE MEDIUM

BACKGROUND OF THE INVENTION

1. Field of the Invention

The present invention relates to a motion vector generation apparatus, motion vector generation method, and non-transitory computer-readable storage medium.

2. Description of the Related Art

In recent years, so-called multimedia-related information such as audio and video signals has been rapidly digitalized, and accordingly, compression encoding and decoding techniques of video signals have received a lot of attention. Since the compression encoding and decoding techniques can decrease a storage capacity required to store a video signal and a frequency band required for transmission, they are very important for multimedia industries.

These compression encoding and decoding techniques compress an information amount/data amount using high autocorrelations (that is, redundancies) for numerous video signals. The redundancy of a video signal includes a temporal redundancy and two-dimensional spatial redundancy. The temporal redundancy can be reduced using motion detection and motion compensation for respective blocks. On the other hand, the spatial redundancy can be reduced using discrete cosine transforms.

In, for example, the compression encoding and decoding techniques known as MPEG, the redundancy of a video signal is reduced by these methods, thereby improving data compression effect of video frames/fields, which change over time. Motion estimation for respective blocks required to reduce the temporal redundancy involves searching for the best approximate blocks between continuously input reference frames/fields (previous frames/fields) and a current frame/field. A vector which represents a moving direction and amount of a corresponding block is called a motion vector. Therefore, motion detection is synonymous with motion vector detection. Such motion vector detection is executed to divide a video signal into blocks that are each a motion vector detection unit (that is, a macroblock) of m pixels×n lines (m and n are integers), and to detect motion vectors for respective blocks. In a stream, since motion information has to be encoded, when a motion vector is to be searched, a similarity (distortion amount) of an image and an amount of code for a motion vector must be considered. In general, a motion vector search is conducted using an evaluation function (1) given by:

$$C = D + \lambda R \quad (1)$$

where C is an evaluation function required to decide a motion vector, D is a difference, R is a generated code amount, and $\lambda$ is a coefficient. As the difference D, a difference amount between an image to be encoded and a predicted image is used, and a difference square sum, difference absolute value sum, or the like is used. Also, a code amount of a motion vector is generally used as R, and a quantization step is generally used as $\lambda$.

The code amount R of the motion vector is calculated based on a difference amount from an estimated motion vector calculated from surrounding motion vectors in the compression method. Upon searching for a motion vector, surrounding motion vectors cannot always be accurately calculated, and the code amount R of the motion vector often cannot be normally evaluated. Japanese Patent Laid-Open No. 2008-154072 describes a method for solving such a problem.

However, with this technique, although the evaluation result of the code amount is improved, in an image in which a large amount of noise is generated due to an amplified camera gain on, for example, a dark part, the noise imposes a strong influence on the evaluation function C, and a correct motion vector often cannot be detected. For example, even when noise components are superposed on an image including a clear characteristic of an object such as a building or automobile (to be referred to as a characteristic image hereinafter), since the difference D is sensitized even to slight coordinate differences, detection errors of the motion vector are eliminated. On the other hand, when noise components are superposed on an originally flat image such as night sky (to be referred to as a characterless image hereinafter), since the difference D is strongly influenced by noise components, a motion vector cannot be set to be (0, 0) even in a still image, resulting in a detection error of a motion vector. As a result, small flicker components are generated, thus deteriorating an image. Hence, as disclosed in Japanese Patent Laid-Open No. 06-296276, a method of detecting a correct motion vector by applying noise reduction to an image to be encoded to eliminate noise components has been proposed.

SUMMARY OF THE INVENTION

However, since a filter such as a low-pass filter or bandpass filter is applied to attain the noise reduction, an original information amount of an input image is lost, and a sense of resolution of the image is impaired.

The present invention provides a motion-compensated encoding technique, which can solve the aforementioned problems, and suffers less deterioration of an image, since it allows detection of a correct motion vector without impairing any sense of resolution even in an image superposed with noise components.

According to one aspect of embodiments of the invention relates to a motion vector generation apparatus which generates a motion vector utilized to execute motion-compensated encoding based on comparison between a block to be encoded in an image to be encoded and a reference block in a reference image, the apparatus comprising: a candidate selection unit configured to sequentially select a candidate from a plurality of motion vector candidates, a pixel difference calculation unit configured to sequentially calculate differences between pixel values of the block to be encoded and pixel values of the reference block corresponding to respective motion vector candidates selected by the candidate selection unit, an average difference calculation unit configured to calculate, as an average difference, differences between an average pixel value obtained by averaging the pixel values of the block to be encoded and respective pixel values of the block to be encoded, a coefficient decision unit configured to decide a weighting coefficient based on a ratio between a minimum difference among the differences calculated by the pixel difference calculation unit and the average difference, and a decision unit configured to calculate, for each motion vector candidate selected by the candidate selection unit, an evaluation value by adding a vector code amount of that candidate weighted using the weighting coefficient to the difference calculated by the pixel difference calculation unit, and to decide a motion vector candidate having a minimum evaluation value, wherein the coefficient decision unit decides the weighting coefficient to increase a weight as the ratio is closer to 1.

Another aspect of embodiments of the invention relates to a motion vector generation apparatus which generates a motion vector utilized to execute motion-compensated encoding based on comparison between a block to be encoded in an image to be encoded and a reference block in a reference image, the apparatus comprising, a candidate selection unit configured to sequentially select a candidate from a plurality of motion vector candidates, a pixel difference calculation unit configured to sequentially calculate differences between pixel values of the block to be encoded and pixel values of the reference block corresponding to respective motion vector candidates selected by the candidate selection unit, a plurality of cost calculation units, each configured to calculate, for each motion vector candidate selected by the candidate selection unit, an evaluation value by adding a vector code amount of that candidate weighted using one of weighting coefficients having different weights to the difference calculated by the pixel difference calculation unit, and to select a motion vector candidate having a minimum evaluation value, wherein the different cost calculation unit uses different weighting coefficient, an average difference calculation unit configured to calculate, as an average difference, differences between an average pixel value obtained by averaging the pixel values of the block to be encoded and respective pixel values of the block to be encoded, and a decision unit configured to decide a motion vector by selecting one of a plurality of motion vector candidates selected by the plurality of cost calculation units based on a ratio between a minimum difference among the differences calculated by the pixel difference calculation unit and the average difference, wherein the decision unit selects the motion vector candidate corresponding to the weighting coefficient which has a larger weight as the ratio is closer to 1.

Further features of the present invention will become apparent from the following description of exemplary embodiments (with reference to the attached drawings).

DESCRIPTION OF THE EMBODIMENTS

Embodiments of the present invention will be described in detail hereinafter with reference to the drawings.

[First Embodiment]

An embodiment of a motion-compensated encoding apparatus according to the present invention will be described in detail below with reference to FIGS. 1 and 2.

Figure 1:
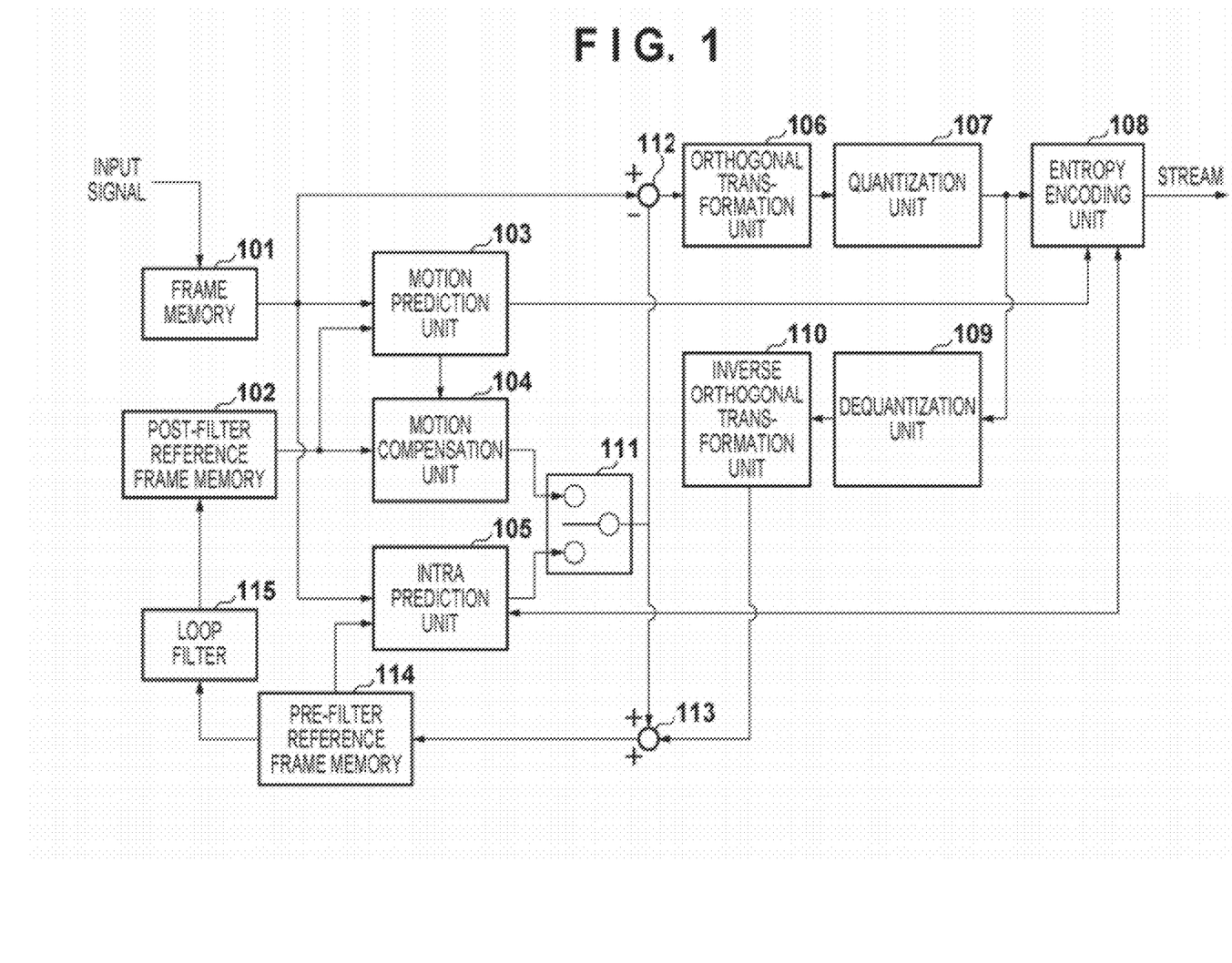
FIG. 1 is a block diagram showing an example of the arrangement of a motion-compensated encoding apparatus according to the first embodiment of the present invention.

FIG. 1 is a block diagram of a motion-compensated encoding apparatus according to the present invention. The image encoding apparatus includes a frame memory 101, post-filter reference frame memory 102, motion prediction unit 103, motion compensation unit 104, intra prediction unit 105, orthogonal transformation unit 106, quantization unit 107, and entropy encoding unit 108. Furthermore, the apparatus includes a dequantization unit 109, inverse orthogonal transformation unit 110, intra/inter determination unit 111, subtractor 112, adder 113, pre-filter reference frame memory 114, and loop filter 115. In the image encoding apparatus shown in FIG. 1, the respective blocks may be implemented by hardware using dedicated logic circuits and memories. Alternatively, the respective blocks may be implemented by software when a computer such as a CPU executes processing programs stored in a memory. With this arrangement, a method of encoding an input image will be described first.

The frame memory 101 saves an input image (original image) in a display order, and sequentially transmits a block to be encoded (m pixels×n lines (m and n are integers)) to the motion prediction unit 103, intra prediction unit 105, and subtractor 112 in an encoding order. The post-filter reference frame memory 102 saves an encoded image, which has undergone filter processing, as a reference image, and sequentially transmits a reference image of a block to be encoded to the motion prediction unit 103 and motion compensation unit 104 in an encoding order. The pre-filter reference frame memory 114 saves an encoded image before filter processing as a reference image, and sequentially transmits a reference image of a block to be encoded to the intra prediction unit 105 in an encoding order.

The motion prediction unit 103 receives the block to be encoded from the frame memory 101 and also post-filter reference image data from the post-filter reference frame memory 102. Then, the motion prediction unit 103 detects a motion vector which represents a motion amount of the block to be encoded in the post-filter reference image data from the received data, and transmits the motion vector to the motion compensation unit 104 together with a post-filter reference frame image data number.

The motion compensation unit 104 generates predicted image data of each block using the motion vector from the motion prediction unit 103 with reference to a reference frame image indicated by the post-filter reference frame image data number in the post-filter reference frame memory 102. The generated predicted image data is transmit to the intra/inter determination unit 111.

On the other hand, the intra prediction unit 105 generates intra predicted images for a plurality of intra prediction modes using decoded data around the block to be encoded transmit from the pre-filter reference frame memory 114. Then, the intra prediction unit 105 performs block matching using the block to be encoded transmit from the frame memory 101 and the generated predicted images to select an appropriate intra prediction mode having a highest correlation, and transmits the selected mode to the intra/inter determination unit 111 together with the predicted image.

The intra/inter determination unit 111 selects predicted image data having a high correlation with the block to be encoded of those transmit from the motion compensation unit 104 and intra prediction unit 105, and transmits the selected predicted image data to the subtractor 112. As a method of selecting predicted image data having a high correlation, for example, a method of selecting a predicted image having a small difference value from an image to be encoded may be used. However, the method is not particularly limited. The subtractor 112 subtracts the predicted image block transmit from the intra/inter determination unit 111 from the block to be encoded transmit from the frame memory 101, and outputs image residual data.

The orthogonal transformation unit 106 executes orthogonal transformation processing of the image residual data output from the subtractor 112, and transmits transformation coefficients to the quantization unit 107. The quantization unit 107 quantizes the transformation coefficients from the orthogonal transformation unit 106 using predetermined quantization parameters, and transmits the quantized coefficients to the entropy encoding unit 108 and dequantization unit 109. The entropy encoding unit 108 inputs the transformation coefficients quantized by the quantization unit 107, and applies entropy encoding such as CAVLC or CABAC to output them as encoded data.

A method of generating reference image data using the transformation coefficients quantized by the quantization unit 107 will be described below. The dequantization unit 109 dequantizes the quantized transformation coefficients transmit from the quantization unit 107. The inverse orthogonal transformation unit 110 executes inverse orthogonal transformation processing of the transformation coefficients dequantized by the dequantization unit 109 to generate decoded residual data, and transmits that data to the adder 113. The adder 113 adds the decoded residual data and predicted image data (to be described later) to generate reference image data, and saves the generated data in the pre-filter reference frame memory 114. Also, the generated reference image data is transmit to the loop filter 115. The loop filter 115 filters the reference image data to remove noise components, and saves the filtered reference image data in the post-filter reference frame memory 102.

Detailed operations of the motion prediction unit 103 which serves as a motion vector generation apparatus of the present invention will be described below. FIG. 2 is a functional block diagram showing an example of the detailed arrangement of the motion prediction unit 103 in this embodiment. The functional block diagram shown in FIG. 2 can also be referred to as a flowchart showing the sequence of processing in the motion prediction unit 103. In this case, respective functional blocks shown in FIG. 2 are interpreted as processing steps executed by the motion prediction unit 103.

Figure 2:
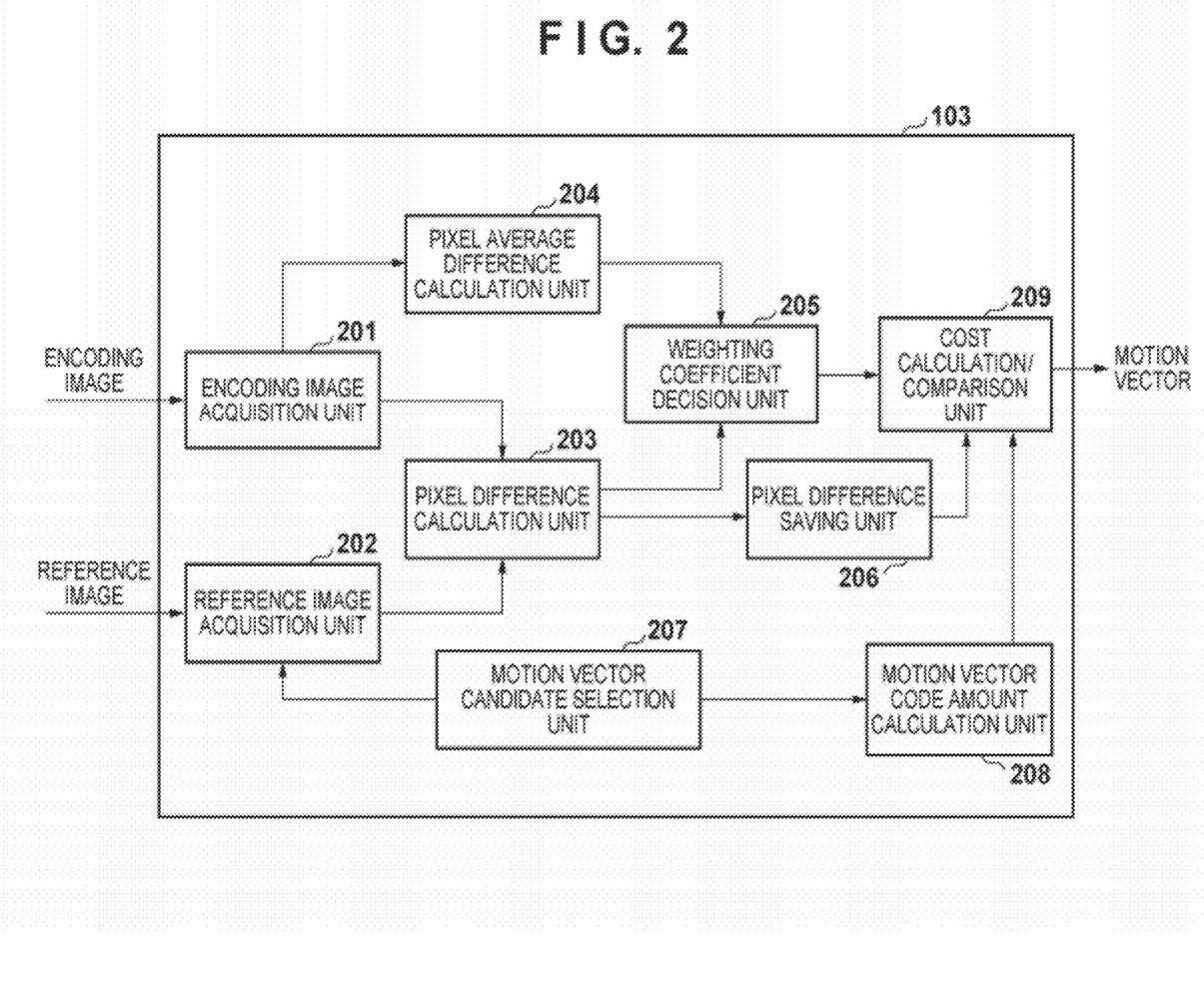
FIG. 2 is a block diagram showing an example of the arrangement of a motion prediction unit according to the first embodiment of the present invention.

Referring to FIG. 2, an encoding image acquisition unit 201 acquires image data of the block to be encoded from the frame memory 101. A motion vector candidate selection unit 207 sequentially selects any one of a plurality of motion vector candidates, and outputs the selected candidate to a reference image acquisition unit 202.

The reference image acquisition unit 202 acquires image data of a reference block corresponding to the motion vector set by the motion vector candidate selection unit 207 from the post-filter reference frame memory 102. Then, the acquired image data of the block to be encoded and that of the reference block are input to a pixel difference calculation unit 203.

The pixel difference calculation unit 203 calculates a sum total $\Sigma |Cur_{ij} - Ref_{ij}|$ (to be referred to as a pixel difference hereinafter) of difference absolute values $|Cur_{ij} - Ref_{ij}|$ of pixel values between the image of the block to be encoded and that of the reference block. Note that i and j are parameters which represent a position of each pixel of a block in the block, and $1 \leq i \leq m$ and $1 \leq j \leq n$ if a block size is given by m×n.

Note that in this embodiment, the pixel difference calculation unit 203 calculates the difference absolute value sum. For example, the pixel difference calculation unit 203 may calculate an absolute value sum of coefficient values obtained by Hadamard transforming difference values of pixel values. That is, the contents of the values to be calculated are not particularly limited as long as these values are calculated based on differences of pixel values. Also, the pixel difference calculated in this unit corresponds to the difference D in the evaluation function (1). Pixel difference amounts for a plurality of motion vector candidates are sequentially calculated, are transmit to a weighting coefficient decision unit 205, and are saved in a pixel difference saving unit 206.

A pixel average difference calculation unit 204 calculates an average pixel value by averaging pixel values of the block to be encoded, and then calculates a sum total $\Sigma |Cur_{ij} - Cur_{ave}|$ (to be referred to as a pixel average difference hereinafter) of difference absolute values $|Cur_{ij} - Cur_{ave}|$ with the pixel values of the block to be encoded. Note that in this embodiment, the pixel average difference calculation unit 204 calculates the difference absolute value sum. For example, the pixel average difference calculation unit 204 may calculate an absolute value sum of coefficient values obtained by Hadamard transforming difference values of pixel values. That is, the contents of the values to be calculated are not particularly limited as long as these values are calculated based on differences of pixel values.

The calculated pixel average difference is transmit to the weighting coefficient decision unit 205. The weighting coefficient decision unit 205 operates to determine whether or not the sequentially input pixel difference is smaller than a minimum value of the pixel differences input so far, and to update the minimum value when the input pixel difference is smaller than the minimum value. After completion of the calculations of the pixel differences for all motion vector candidates, the weighting coefficient decision unit 205 decides a weighting coefficient using the following conditions based on the minimum value of the pixel differences (to be referred to as a minimum pixel difference hereinafter) and the pixel average difference.

When minimum pixel difference/pixel average difference≤Th0 or Th1≤minimum pixel difference/pixel average difference (for Th0<Th1), an image to be encoded is determined as a characteristic image having a clear characteristic of an object such as a building or automobile, and a predetermined coefficient λ1, which is set in advance, is set as a weighting coefficient. The coefficient to be set corresponds to λ in the evaluation function (1) and, for example, a quantization step is set. On the other hand, when Th0<minimum pixel difference/pixel average difference<Th1, an image to be encoded is determined as a characterless image, and a predetermined coefficient λ2, which is set in advance, is set as a weighting coefficient. Note that λ1<λ2, and in an originally flat characterless image such as night sky, importance is attached to a vector code amount rather than a pixel difference so as to prevent wasteful motion vectors from being generated, thereby preventing deterioration of image quality.

The reason why a characteristic image including a clear characteristic of an object such as a building or automobile and an originally flat characterless image such as night sky can be distinguished from each other under these conditions will be explained below with reference to FIGS. 3A to 3D and FIG. 4.

Figure 3A:
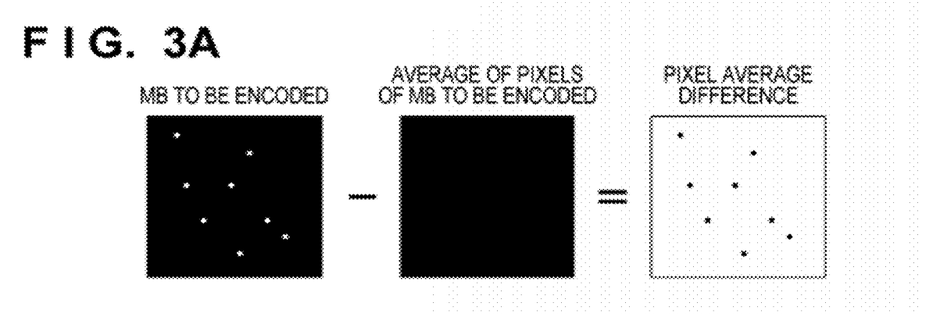
FIGS. 3A to 3D are views explaining the operations of the motion prediction unit according to the first embodiment of the present invention.
Figure 3B:
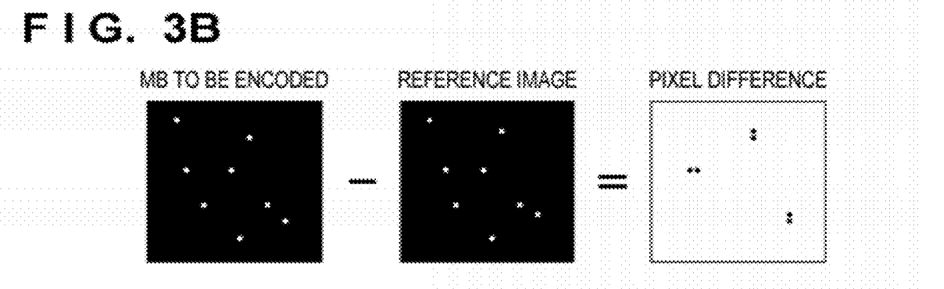

FIGS. 3A and 3B show images of a pixel average difference and pixel difference of an image in which noise components are superposed on night sky as an example in which an image to be encoded is a characterless image. FIG. 3A shows an image of the pixel average difference calculated by subtracting an average pixel value of a block to be encoded from pixel values of the block to be encoded. Since night sky is an originally flat image, an image generated based on the average pixel value of the block to be encoded has almost no variations from an original night sky image. For this reason, the pixel average difference calculated by subtracting the average pixel value of pixels of the block to be encoded from the pixel values of the block to be encoded includes differences of almost only noise components.

FIG. 3B shows an image of the pixel difference calculated by subtracting pixels of a reference block from those of the block to be encoded. In this case as well, when an image is still, a difference between the block to be encoded and reference block includes almost only noise components. As can be seen from comparison between the images of the pixel average difference and pixel difference, since the differences are only noise components in both the images, a deviation between the pixel average difference and pixel difference is small.

Figure 3C:
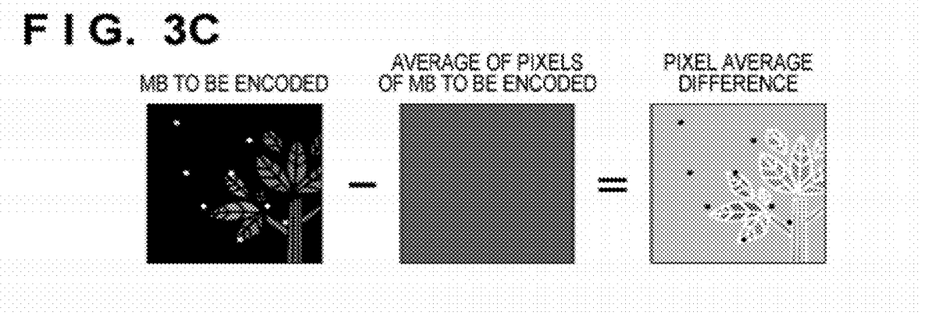
Figure 3D:
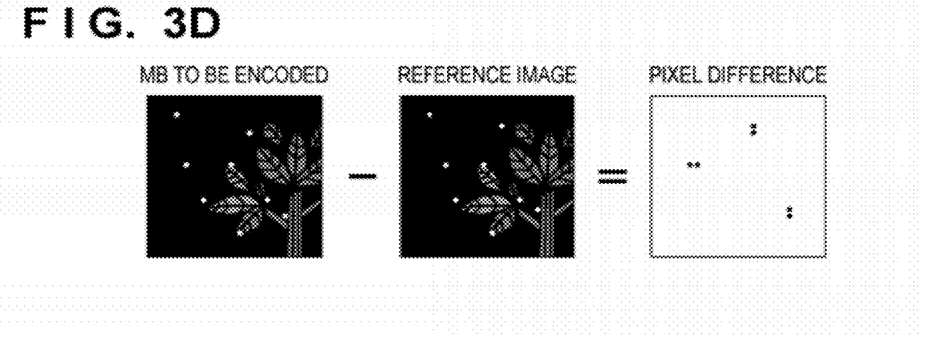

On the other hand, FIGS. 3C and 3D show images of the pixel average difference and pixel difference of an image in which noise components are superposed on branches of a tree captured at night as an example in which an image to be encoded is a characteristic image. FIG. 3C shows an image of the pixel average difference calculated by subtracting an average pixel value of the block to be encoded from pixel values of the block to be encoded. Since the branches of the tree originally include high-frequency components, an image generated based on the average pixel value of the block to be encoded has a large difference from an original image. For this reason, the pixel average difference calculated by subtracting the pixel average value of the block to be encoded from pixel values of the block to be encoded assumes a large value.

FIG. 3D shows an image of the pixel difference calculated by subtracting pixel values of a reference block from those of the block to be encoded. In this case, when an image is still, the pixel difference calculated by subtracting the reference pixels from the block to be encoded includes differences of almost only noise components. Upon comparison of even a moving image with an image generated based on the average pixel value of the block to be encoded, a difference is small. As can be seen from comparison between the images of the pixel average difference and pixel difference, a deviation between the pixel average difference and pixel difference is large in this case.

Figure 4:
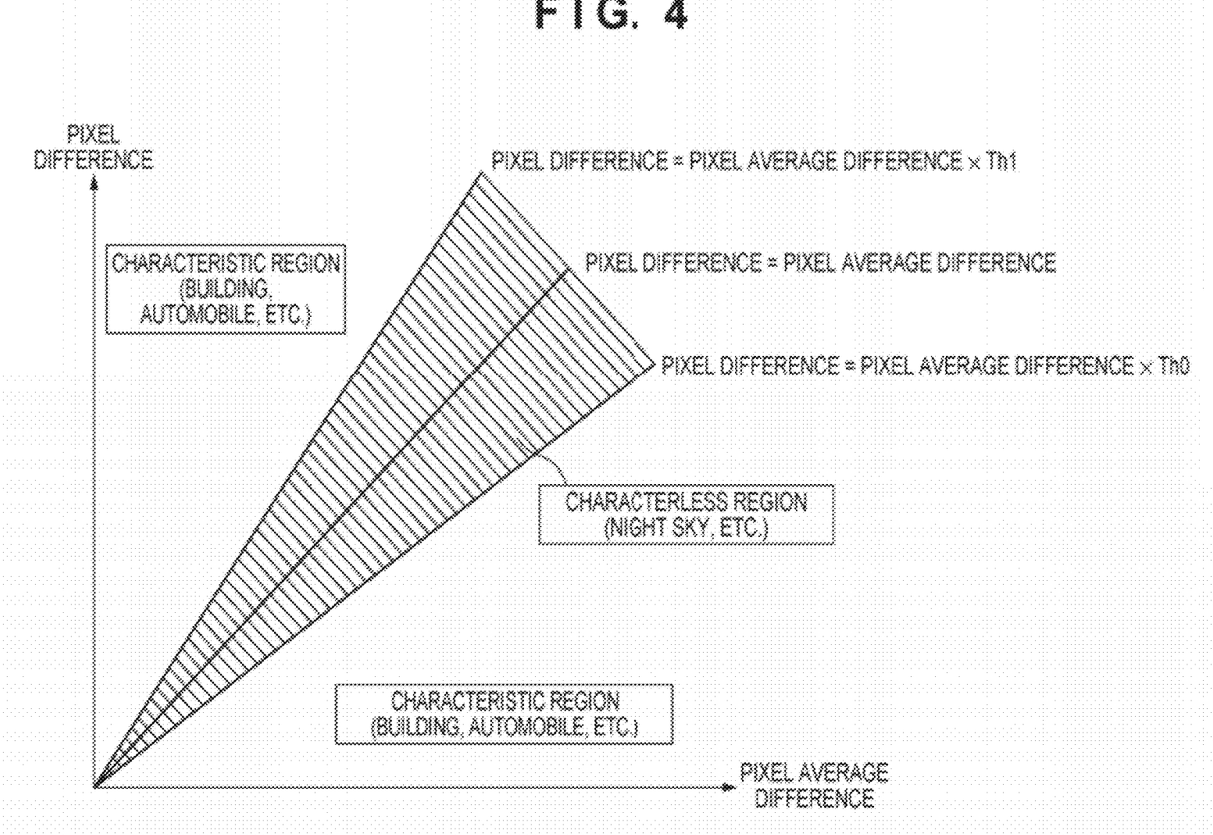
FIG. 4 is a graph explaining the operations of the motion prediction unit according to the first embodiment of the present invention.

As described above, a deviation between the pixel average difference and pixel difference is small in case of a characterless image, and is large in case of a characteristic image. That is, as a ratio between the pixel average difference and pixel difference is closer to 1, that image is determined as a characterless image. Hence, a weighting coefficient is selected to have a larger weight as the difference ratio is closer to 1. Then, the predetermined thresholds Th0 and Th1 are set, as shown in FIG. 4. When the ratio of "minimum pixel difference/pixel average difference" is larger than Th0, and falls within a predetermined range less than Th1, that image is discriminated as a characterless image; otherwise, it is discriminated as a characteristic image. At this time, the predetermined range is defined by Th0<1<Th1.

Referring back to FIG. 2, after the weighting coefficient decision unit 205 decides the weighting coefficient, the motion vector candidate selection unit 207 sequentially sets the same candidate vectors again, and inputs them to a vector code amount calculation unit 208, which calculates vector code amounts for the candidate vectors. From the pixel difference saving unit 206, a pixel difference amount corresponding to the set candidate vector is read out, and is transmit to a cost calculation/comparison unit 209.

The cost calculation/comparison unit 209 multiplies the vector code amount for each candidate by the weighting coefficient, and adds the pixel difference to that product, thereby calculating a cost as an evaluation value corresponding to each candidate vector. The cost calculation/comparison unit 209 determines whether or not the sequentially calculated cost value is smaller than a minimum value of cost values calculated so far. If the cost value is smaller than the minimum value, the cost calculation/comparison unit 209 updates the minimum value, and stores that cost value together with corresponding motion vector information. Then, the cost calculation/comparison unit 209 decides, as a motion vector for the block to be encoded, the motion vector stored at the time of completion of the calculations and comparisons of the cost values for all motion vector candidates.

Note that the weighting coefficient decision unit 205 of this embodiment decides a weighting coefficient by defining one range based on the minimum pixel difference and pixel average difference. Alternatively, the number of thresholds may be increased to set a plurality of ranges, thus calculating weighting coefficients stepwise.

According to the aforementioned embodiment, a characteristic of a block is determined based on differences of pixel values in the block to select a coefficient corresponding to the characteristic, thus allowing to select an optimal motion vector corresponding to the characteristic of the block. Since the filter is not used even when noise components are superposed, an appropriate motion vector can be selected without impairing resolution.

[Second Embodiment]

Figure 5:
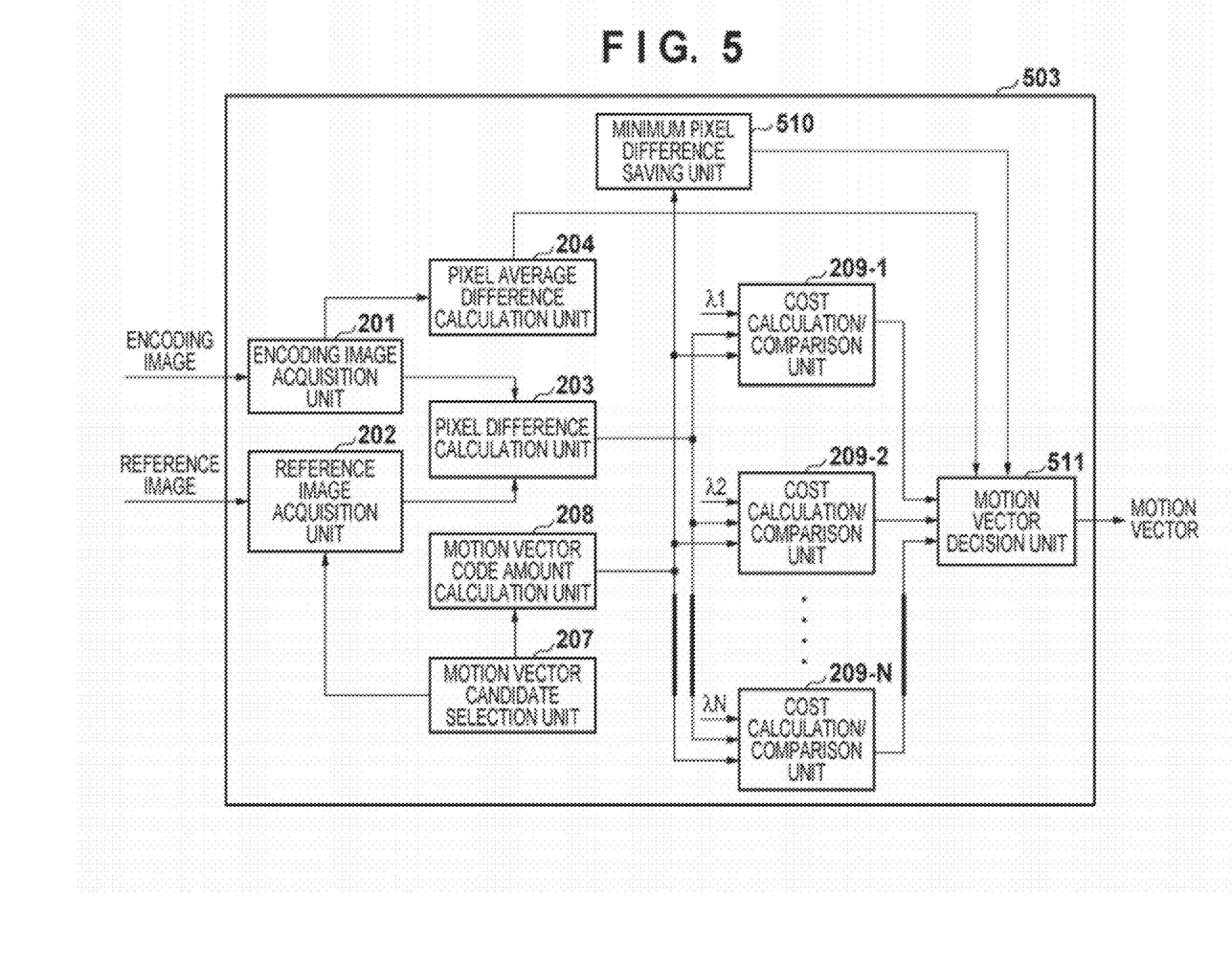
FIG. 5 is a block diagram showing an example of the arrangement of a motion-compensated encoding apparatus according the second embodiment of the present invention.

Another embodiment of an image encoding apparatus according to the present invention will be described in detail below with reference to the block diagram of FIG. 5. FIG. 5 is a block diagram showing an example of the detailed arrangement of a motion prediction unit 503 as a motion vector generation apparatus according to this embodiment. The arrangement of the image encoding apparatus is the same as that of the first embodiment, and the image encoding apparatus according to the second embodiment is configured by replacing the motion prediction unit 103 in FIG. 1 by the motion prediction unit 503 shown in FIG. 5. Note that the functional block diagram of FIG. 5 can also be referred to as a flowchart showing the sequence of processing of the motion prediction unit 503 as in FIG. 2. In this case, respective functional blocks shown in FIG. 5 are interpreted as processing steps executed by the motion prediction unit 503.

Referring to FIG. 5, an encoding image acquisition unit 201 acquires image data of a block to be encoded from a frame memory 101. A motion vector candidate selection unit 207 sequentially sets one of a plurality of motion vector candidates in a reference image acquisition unit 202. At the same time, the motion vector candidate selection unit 207 transmits the motion vector candidate to a motion vector code amount calculation unit 208, which calculates a motion vector code amount for the candidate vector.

The reference image acquisition unit 202 acquires image data of a reference block corresponding to the motion vector set by the motion vector candidate selection unit 207 from a post-filter reference frame memory 102. Then, the acquired image data of the block to be encoded and that of the reference block are input to a pixel difference calculation unit 203.

The pixel difference calculation unit 203 calculates a sum total $\Sigma |Cur_{ij} - Ref_{ij}|$ (to be referred to as a pixel difference hereinafter) of difference absolute values $|Cur_{ij} - Ref_{ij}|$ of pixel values between the image of the block to be encoded and that of the reference block. Note that i and j are parameters which represent a position of each pixel of a block in the block, and $1 \leq i \leq m$ and $1 \leq j \leq n$ if a block size is given by m×n.

Note that in this embodiment, the pixel difference calculation unit 203 calculates the difference absolute value sum. For example, the pixel difference calculation unit 203 may calculate an absolute value sum of coefficient values obtained by Hadamard transforming difference values of pixel values. That is, the contents of the values to be calculated are not particularly limited as long as these values are calculated based on differences of pixel values. Also, the pixel difference calculated in this unit corresponds to the difference D in the evaluation function (1).

Pixel difference amounts for a plurality of motion vector candidates are sequentially calculated, are transmit to a minimum pixel difference saving unit 510 and N cost calculation/comparison units 209-1 to 209-N. The minimum pixel difference saving unit 510 operates to determine whether or not the sequentially input pixel difference is smaller than a minimum value of the pixel differences input so far, and to update the minimum value when the pixel difference is smaller than the minimum value.

After completion of the calculations of the pixel differences for all motion vector candidates, the minimum pixel difference saving unit 510 transmits the minimum pixel difference to a motion vector decision unit 511. The pixel difference calculated by the pixel difference calculation unit 203 and the motion vector code amount calculated by the motion vector code amount calculation unit 208 are input to the N cost calculation/comparison units 209-1 to 209-N. To the N cost calculation/comparison units, different weighting coefficients $\lambda 1$ to $\lambda N$ are input. Each of these cost calculation/comparison units multiplies the motion vector code amount by the set weighting coefficient, and adds the pixel difference to that product, thereby calculating a cost as an evaluation value for the candidate vector.

Note that the cost corresponds to the evaluation function C required to decide a motion vector, the pixel difference corresponds to the difference D, the motion vector code amount corresponds to the generated code amount R, and $\lambda$ corresponds to the coefficient $\lambda$ in the evaluation function (1). Each cost calculation/comparison unit determines whether or not the calculated cost is smaller than a minimum value of the costs calculated so far. When the calculated cost is smaller than the minimum value, the cost calculation/comparison unit updates the minimum value, and saves the cost together with the corresponding candidate motion vector and pixel difference. Then, the motion vector stored at the time of completion of the calculations of costs for all motion vector candidates is decided as a motion vector for the block to be encoded. As a result, N motion vectors are calculated in correspondence with the N cost calculation/comparison units.

A pixel average difference calculation unit 204 calculates an average pixel value by averaging pixel values of the block to be encoded, and then calculates a sum total $\Sigma|Cur_{ij}-Cur_{ave}|$ (to be referred to as a pixel average difference hereinafter) of difference absolute values $|Cur_{ij}-Cur_{ave}|$ with the pixel values of the block to be encoded. Note that in this embodiment, the pixel average difference calculation unit 204 calculates the difference absolute value sum. For example, the pixel average difference calculation unit 204 may calculate an absolute value sum of coefficient values obtained by Hadamard transforming difference values of pixel values. That is, the contents of the values to be calculated are not particularly limited as long as these values are calculated based on differences of pixel values.

The calculated pixel average difference is transmit to the motion vector decision unit 511. The motion vector decision unit 511 selects one of the N motion vectors based on the minimum pixel difference and pixel average difference, and decides that motion vector as that for the block to be encoded.

Figure 6:
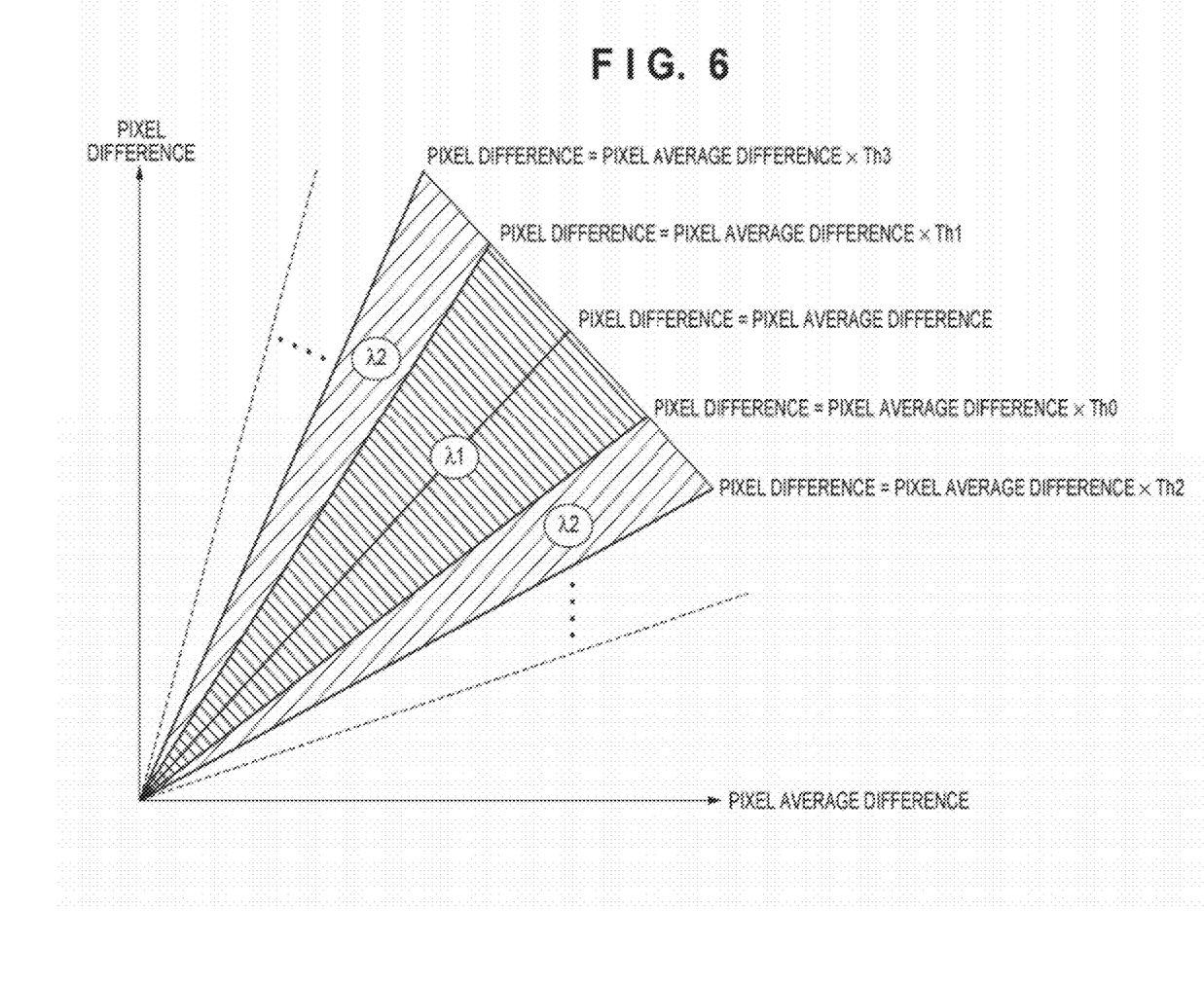
FIG. 6 is a graph explaining the operations of a motion prediction unit according to the second embodiment of the present invention.

In this embodiment as well, a weighting coefficient is selected to have a larger weight as a difference ratio is closer to 1, as in the first embodiment. Hence, as shown in FIG. 6, when Th0<minimum pixel difference/pixel average difference<Th1, a motion vector of the cost calculation/comparison unit 209-1 using a weighting coefficient $\lambda 1$ is selected. In this case, since Th0<1<Th1, when the difference ratio is included in a predetermined range including 1, a maximum weighting coefficient is selected in this embodiment as well. When Th2<minimum pixel difference/pixel average difference≤Th0 or when Th1≤minimum pixel difference/pixel average difference<Th3 (Th2<Th0, Th3>Th1), a motion vector of the cost calculation/comparison unit 209-2 using a weighting coefficient $\lambda 2$ ($\lambda 1<\lambda 2$) is selected. In this way, by setting thresholds corresponding to the respective cost calculation/comparison units, one of N vectors is selected. In this case, a smaller weighting coefficient is set as the ratio is separated farther away from 1 (including a case in which the ratio is larger than 1 and that in which it is smaller than 1), and the selected motion vector is decided as that for the block to be encoded.

In this embodiment, weighting coefficients having different weights are associated with different ranges required to determine the magnitudes of the difference ratio, and a candidate based on the weighting coefficient associated with the range to which the calculated ratio belongs is selected as a motion vector. In this way, a coefficient corresponding to a characteristic of a block is selected, and an optimal motion vector corresponding to the characteristic of the block can be selected as in the first embodiment. Since a filter is not used even when noise components are superposed, an appropriate motion vector can be selected without impairing resolution.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-250258, filed Nov. 8, 2010, which is hereby incorporated by reference herein in its entirety.

What is claimed is:

1. A motion vector generation apparatus which generates a motion vector utilized to execute motion-compensated encoding based on comparison between a block to be encoded in an image to be encoded and a reference block in a reference image, said apparatus comprising:

a candidate selection unit configured to sequentially select a candidate from a plurality of motion vector candidates;

a pixel difference calculation unit configured to sequentially calculate differences between pixel values of the block to be encoded and pixel values of the reference block corresponding to respective motion vector candidates selected by said candidate selection unit;

an average difference calculation unit configured to calculate, as an average difference, differences between an average pixel value obtained by averaging the pixel values of the block to be encoded and respective pixel values of the block to be encoded;

a coefficient decision unit configured to decide a weighting coefficient based on a ratio between a minimum difference among the differences calculated by said pixel difference calculation unit and the average difference; and a decision unit configured to calculate, for each motion vector candidate selected by said candidate selection unit, an evaluation value by adding a vector code amount of that candidate weighted using the weighting coefficient to the difference calculated by said pixel difference calculation unit, and to decide a motion vector candidate having a minimum evaluation value, wherein said coefficient decision unit decides the weighting coefficient to increase a weight as the ratio is closer to 1.

2. The apparatus according to claim 1, wherein said coefficient decision unit decides the weighting coefficient by
selecting one coefficient having a maximum weight among at least two weighting coefficients of different weights, when the ratio is included in a predetermined range including 1, and
selecting the other coefficient having a weight smaller than the one coefficient, when the ratio is not included in the predetermined range.

3. A motion vector generation apparatus which generates a motion vector utilized to execute motion-compensated encoding based on comparison between a block to be encoded in an image to be encoded and a reference block in a reference image, said apparatus comprising:

a candidate selection unit configured to sequentially select a candidate from a plurality of motion vector candidates;

a pixel difference calculation unit configured to sequentially calculate differences between pixel values of the block to be encoded and pixel values of the reference block corresponding to respective motion vector candidates selected by said candidate selection unit;

a plurality of cost calculation units, each configured to calculate, for each motion vector candidate selected by said candidate selection unit, an evaluation value by adding a vector code amount of that candidate weighted using one of weighting coefficients having different weights to the difference calculated by said pixel difference calculation unit, and to select a motion vector candidate having a minimum evaluation value, wherein the different cost calculation unit uses different weighting coefficient;

an average difference calculation unit configured to calculate, as an average difference, differences between an average pixel value obtained by averaging the pixel values of the block to be encoded and respective pixel values of the block to be encoded; and a decision unit configured to decide a motion vector by selecting one of a plurality of motion vector candidates selected by said plurality of cost calculation units based on a ratio between a minimum difference among the differences calculated by said pixel difference calculation unit and the average difference, wherein said decision unit selects the motion vector candidate corresponding to the weighting coefficient which has a larger weight as the ratio is closer to 1.

4. The apparatus according to claim 3, wherein the weighting coefficients having the different weights are respectively associated with different ranges required to determine a magnitude of the ratio, and
said decision unit selects the motion vector candidate based on the weighting coefficient associated with a range, to which the ratio belongs, of the different ranges.

5. The apparatus according to claim 3, wherein when the ratio is included in a predetermined range including 1, said decision unit selects the motion vector candidate based on a weighting coefficient having a maximum weight among the weighting coefficients having the different weights.

6. A motion vector generation method in a motion vector generation apparatus, which generates a motion vector utilized to execute motion-compensated encoding based on comparison between a block to be encoded in an image to be encoded and a reference block in a reference image, the method comprising:

a candidate selection step of sequentially selecting a candidate from a plurality of motion vector candidates;

a pixel difference calculation step of sequentially calculating differences between pixel values of the block to be encoded and pixel values of the reference block corresponding to respective motion vector candidates selected in the candidate selection step;

an average difference calculation step of calculating, as an average difference, differences between an average pixel value obtained by averaging the pixel values of the block to be encoded and respective pixel values of the block to be encoded;

a coefficient decision step of deciding a weighting coefficient based on a ratio between a minimum difference among the differences calculated in the pixel difference calculation step and the average difference; and a decision step of calculating, for each motion vector candidate selected in the candidate selection step, an evaluation value by adding a vector code amount of that candidate weighted using the weighting coefficient to the difference calculated in the pixel difference calculation step, and deciding a motion vector candidate having a minimum evaluation value, wherein in the coefficient decision step, the weighting coefficient is decided to increase a weight as the ratio is closer to 1.

7. A motion vector generation method in a motion vector generation apparatus, which generates a motion vector utilized to execute motion-compensated encoding based on comparison between a block to be encoded in an image to be encoded and a reference block in a reference image, the method comprising:

a candidate selection step of sequentially selecting a candidate from a plurality of motion vector candidates;

a pixel difference calculation step of sequentially calculating differences between pixel values of the block to be encoded and pixel values of the reference block corresponding to respective motion vector candidates selected in the candidate selection step;

a cost calculation step of calculating, for each motion vector candidate selected in the candidate selection step, an evaluation value by adding a vector code amount of that candidate weighted using one of weighting coefficients having different weights to the difference calculated in the pixel difference calculation step, and selecting a motion vector candidate having a minimum evaluation value, wherein the different cost calculation unit uses different weighting coefficient;

an average difference calculation step of calculating, as an average difference, differences between an average pixel value obtained by averaging the pixel values of the block to be encoded and respective pixel values of the block to be encoded; and a decision step of deciding a motion vector by selecting one of a plurality of motion vector candidates selected by the plurality of cost calculation units in the cost calculation step based on a ratio between a minimum difference among the differences calculated in the pixel difference calculation step and the average difference, wherein in the decision step, the motion vector candidate is selected corresponding to the weighting coefficient which has a larger weight as the ratio is closer to 1.

8. A non-transitory computer readable storage medium storing a computer program which causes a computer to function as a motion vector generation apparatus which generates a motion vector utilized to execute motion-compensated encoding based on comparison between a block to be encoded in an image to be encoded and a reference block in a reference image, said apparatus comprising:

a candidate selection unit configured to sequentially select a candidate from a plurality of motion vector candidates;

a pixel difference calculation unit configured to sequentially calculate differences between pixel values of the block to be encoded and pixel values of the reference block corresponding to respective motion vector candidates selected by said candidate selection unit;

an average difference calculation unit configured to calculate, as an average difference, differences between an average pixel value obtained by averaging the pixel values of the block to be encoded and respective pixel values of the block to be encoded;

a coefficient decision unit configured to decide a weighting coefficient based on a ratio between a minimum difference among the differences calculated by said pixel difference calculation unit and the average difference; and a decision unit configured to calculate, for each motion vector candidate selected by said candidate selection unit, an evaluation value by adding a vector code amount of that candidate weighted using the weighting coefficient to the difference calculated by said pixel difference calculation unit, and to decide a motion vector candidate having a minimum evaluation value, wherein said coefficient decision unit decides the weighting coefficient to increase a weight as the ratio is closer to 1.

9. A non-transitory computer readable storage medium storing a computer program which causes a computer to function as a motion vector generation apparatus which generates a motion vector required to execute motion-compensated encoding based on comparison between a block to be encoded in an image to be encoded and a reference block in a reference image, said apparatus comprising:

a candidate selection unit configured to sequentially select a candidate from a plurality of motion vector candidates;

a pixel difference calculation unit configured to sequentially calculate differences between pixel values of the block to be encoded and pixel values of the reference block corresponding to respective motion vector candidates selected by said candidate selection unit;

a plurality of cost calculation units, each configured to calculate, for each motion vector candidate selected by said candidate selection unit, an evaluation value by adding a vector code amount of that candidate weighted using one of weighting coefficients having different weights to the difference calculated by said pixel difference calculation unit, and to select a motion vector candidate having a minimum evaluation value, wherein the different cost calculation unit uses different weighting coefficient;

an average difference calculation unit configured to calculate, as an average difference, differences between an average pixel value obtained by averaging the pixel values of the block to be encoded and respective pixel values of the block to be encoded; and a decision unit configured to decide a motion vector by selecting one of a plurality of motion vector candidates selected by said plurality of cost calculation units based on a ratio between a minimum difference among the differences calculated by said pixel difference calculation unit and the average difference, wherein said decision unit selects the motion vector candidate corresponding to the weighting coefficient which has a larger weight as the ratio is closer to 1.

* * * * *